US005712350A

United States Patent [19]

Fleischer et al.

[11] Patent Number: 5,712,350
[45] Date of Patent: *Jan. 27, 1998

[54] OXIDATION OF POLYARYLENE SULFIDES

[75] Inventors: Dietrich Fleischer, Darmstadt; Heinz Strutz, Usingen; Jürgen Kulpe, Frankfurt am Main; Andreas Schleicher, Einhausen, all of Germany

[73] Assignee: Hoechst Aktiengesellschaft, Frankfurt, Germany

[*] Notice: The term of this patent shall not extend beyond the expiration date of Pat. No. 5,496,917.

[21] Appl. No.: 591,162

[22] Filed: Jan. 16, 1996

Related U.S. Application Data

[63] Continuation of Ser. No. 237,065, May 3, 1994, abandoned.

[30] Foreign Application Priority Data

May 4, 1993 [DE] Germany .................... 43 147 36.4

[51] Int. Cl.$^6$ .......................... C08F 283/00; C08L 81/00
[52] U.S. Cl. ......................... 525/535; 525/537; 528/388
[58] Field of Search ........................... 525/535, 537; 528/388

[56] References Cited

U.S. PATENT DOCUMENTS

| | | | |
|---|---|---|---|
| 3,326,865 | 6/1967 | Smith | 260/79.3 |
| 3,354,129 | 11/1967 | Edmonds, Jr. et al. | 260/79 |
| 3,948,865 | 4/1976 | Brady et al. | 260/79 |
| 4,383,080 | 5/1983 | Dupree | 525/537 |

FOREIGN PATENT DOCUMENTS 0 091 088  10/1983  European Pat. Off. .

OTHER PUBLICATIONS

Fujisawa et al. J. Polym. Sci. Part, B, vol. 9, 91–94 (1971).

Primary Examiner—Helen Lee
Attorney, Agent, or Firm—Connolly & Hutz

[57] ABSTRACT

Process for oxidizing a polymer containing thioether groups, in which the polymer in solid form in a suspension medium is oxidized with ozone. The polymer obtained is suitable for the production of functional parts on which high demands are made.

16 Claims, No Drawings

OXIDATION OF POLYARYLENE SULFIDES

This application is a continuation of U.S. Ser. No. 08/237,065, filed on May 3, 1994, now abandoned.

The invention relates to the oxidation of polyarylene sulfides using ozone as oxidant.

Polyarylene sulfides have been known for some time. Owing to their high heat distortion temperature and good resistance to chemicals, these polymers are employed for components on which high demands are made. However, some applications have higher material requirements. Specifically, an increase in the glass transition temperature of the polymers is frequently desirable. This is supposed to be achieved by a polymer-analogous oxidation of polyphenylene sulfide to polyphenylene sulfoxide in acetic acid using concentrated nitric acid for 24 hours at from 0° to +5° C. (U.S. Pat. No. 3,303,007). However, the properties given for the polymer formed indicate that no polymer having a sulfur/oxygen ratio of 1 to 1 was obtained, since the values for the heat distortion temperature have not been increased. The term "polymer-analogous" means the conversion of one polymer into another. Disadvantages of the process are firstly the long reaction time required, secondly the possibility of electrophilic addition and thirdly the acid attack of the strong mineral acid on the thioether bond with long reaction times (degradation reactions).

It is an object of the invention to develop processes for oxidizing polyarylene sulfides, which require substantially shorter reaction times at lower temperatures. The use as starting material of polyarylene sulfides having relatively high molecular weights is also desired.

This object is achieved by the use of ozone as oxidant.

The invention provides a process for oxidizing polyarylene sulfides (polyarylene thioethers), in which a polymer in solid form in a suspension medium is oxidized with ozone.

The oxidation of polymeric arylene sulfides with ozone according to the invention leads to the formation of polyarylene sulfoxides with high selectivity. This is all the more surprising since ozone is an extremely strong oxidant. Appropriate use of the amount of ozone makes it possible either to convert the sulfur bond completely into the sulfoxide bond or to achieve any desired S/O ratio in the polymer chain, the selection of the suspension medium used having a decisive influence.

Polymers which can be used are linear and branched polyarylene compounds comprising the recurring unit of the formula I and at least one thioether group:

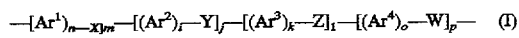

where $Ar^1$, $Ar^2$, $Ar^3$, $Ar^4$, W, X, Y and Z are, independently of one another, identical or different. The indices n, m, i, j, k, l, o and p are, independently of one another, zero or the integers 1, 2, 3 or 4, their sum having to be at least 2. $Ar^1$, $Ar^2$, $Ar^3$ and $Ar^4$ in the formula (I) are arylene systems having from 6 to 18 carbon atoms. W, X, Y and Z are divalent linking groups selected from among —$SO_2$—, —S—, —SO—, —CO—, —O—, —$CO_2$—, alkylene or alkylidene groups having 1–6, preferably from 1 to 4, carbon atoms.

Suitable polymers are, for example, polyarylene thioethers comprising recurring units of the formulae (II)–(VI), the syntheses of which are described, for example, in Chimia 28 (1974), 567:

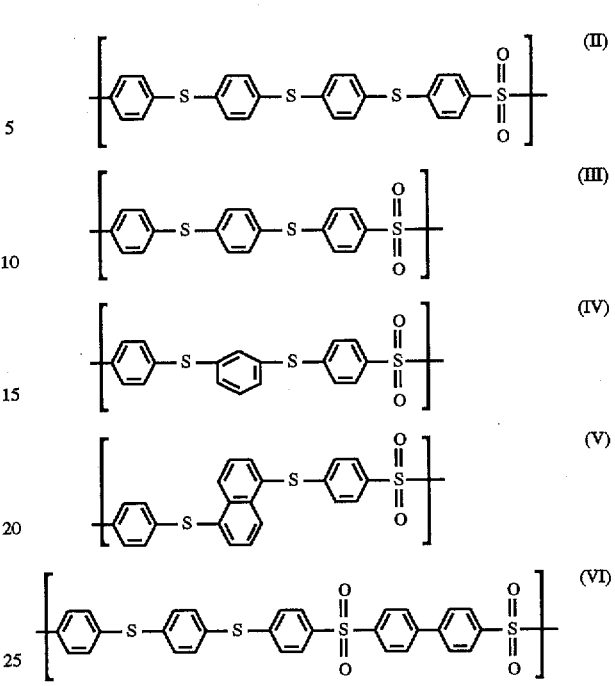

and also polyarylene thioethers comprising recurring units of the formula (VII), which are described, for example, in U.S. Pat. No. 4,016,145.

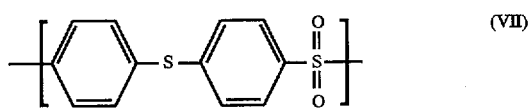

The preferred polyarylene thioether is polyphenylene sulfide (PPS) comprising the recurring unit of the formula (VIII), the preparation process of which is described, for example, in the U.S. Pat. Nos. 3,354,129, 3,919,177, 4,038, 262 and 4,282,347.

Compounds of the formula VIII are generally 1,4-linked polyarylene sulfides which can have a proportion of up to 30 mol % of a 1,2—and/or 1,3-linkage at the aromatic ring.

The polyarylene thioethers suitable for the invention are generally those having an average molecular weight of from 4000 to 200,000, preferably from 10,000 to 150,000, in particular from 25,000 to 100,000, determined by GPC.

The particle size of the polymers used generally lies in the range from $5×10^{-6}$ to $500×10^{-6}$ m, preferably from $10×10^{-6}$ to $300×10^{-6}$ m and in particular from $10×10^{-6}$ to $200×10^{-6}$ m.

The reaction temperatures lie in the range from −10° to +80° C., preferably from 0° to 50° C. The reaction time required depends on the supply of ozone and on the type of reactor selected and is generally from 1 minute to 2 hours, preferably from 5 to 90 minutes and in particular from 5 to 60 minutes.

However, it is also possible to reduce times to below one minute with optimized reaction conditions.

The oxidation according to the invention is carried out using an ozone-containing gas stream in which the ozone is generally present in a concentration of from 0.1 to 9% by volume, preferably from 2 to 6% by volume. Suitable carrier gases for the ozone are oxygen or inert gases such as nitrogen or else mixtures thereof. Likewise, dried air can be used in the generation of the ozone. The ozone is generally generated by methods known in the art, for example by silent electric discharge.

The reaction is carried out in a reaction vessel which is suitable for gassing reactions and which allows the temperature to be controlled. This can, for example, be a gassed stirred reactor or a bubble column.

Suitable suspension media are all liquid compounds which are inert under the reaction conditions, for example water, lower aliphatic alcohols and carboxylic acids each having 1–6, preferably 1–3 carbon atoms in the alkyl group, the esters of the two specified classes of compounds, hydrocarbons having 1–12 carbon atoms which may be halogenated with chlorine or fluorine, and mixtures of the specified compounds. Mineral acids, for example concentrated sulfuric acid, are also suitable. In protic solvents or solvent mixtures containing protic solvents, the addition of a mineral acid, for example sulfuric acid, can be advantageous.

For example, in methylene chloride complete oxidation to the sulfoxide is achieved in a short time. In contrast, when using lower aliphatic carboxylic acids with an addition of a mineral acid only partial oxidation is achieved, since the takeup rate of the ozone drops significantly on reaching a sulfur/oxygen ratio of 1:0.5. Although it is possible to achieve complete oxidation here too, this requires uneconomically long reaction times.

The suspension medium generally dissolves none or only very small amounts of the polymer, but functions as a heat and ozone transfer medium and has a controlling influence on the selectivity. Although the reaction can also be carried out in the non-liquid phase, vigorous mixing of the polymer powder then has to be ensured, since otherwise a hot spot can occur at the point of ozone introduction, which occurrence has a negative effect on the oxidation selectivity.

The compounds obtained according to the invention either can be thermoplastically processed or can, for example, be further processed by customary sintering processes; however, this is dependent on their melting points. The first group can be converted by processing methods customary for thermoplastics, for example injection molding or extrusion, into molded and functional parts. The molding compositions can also contain known pulverulent fillers such as chalk, talc, clay, mica, and/or fibrous reinforcements such as glass and carbon fibers, whiskers, and also further customary additives and processing aids, for example, lubricants, mold release agents, antioxidants and UV stabilizers. Such parts are used in functional components on which high demands can be made, for example in aircraft and automobile construction and also in the construction of chemical apparatus.

The second group, i.e. the polymers processible by sintering processes, are used in functional parts exposed to high temperatures and aggressive chemicals.

In the examples, $T_g$ is the glass transition temperature, $T_m$ is the melting point.

EXAMPLES

1) Polyphenylene sulfoxide (PPSO)

54.1 g of a polyphenylene sulfoxide (PPS) powder (MW 40,000) having an average particle diameter of $20 \times 10^{-6}$ were suspended in 400 ml of methylene chloride in a reaction vessel fitted with a disk stirrer. Ozone-containing gas was passed into the suspension at temperatures of from $-5°$ to $-7°$ C. until 0.5 mol of ozone had been absorbed (72 minutes). The ozone concentration during gassing was from 51 to 115 gram per cubic meter of carrier gas. After the reaction the polymer powder was filtered off with suction and dried. In the infrared spectrum, only the exclusive formation of sulfoxide groups could be observed. $T_g$: 240° C., $T_m$: ≧370° C. (decomposition).

Elemental analysis: $C_6H_4SO$

C 58.04 H 3.25 S 25.82 O 12.89 (calc.)

C 58.3 H 3.5 S 25.45 0 12.75 (found)

The sulfur/oxygen ratio of the polymer obtained was 1:1.

2) Polyphenylene sulfide sulfoxide (PPS/SO)

216 g of a PPS powder as in Example 1 were suspended in a mixture of 850 ml of glacial acetic acid and 8.5 ml of sulfuric acid in a bubble column (5 cm in diameter, 120 cm in length), the temperature of which could be controlled. At from 10° to 20° C. the suspension was gassed via a glass frit with an ozone-containing gas stream (flow rate 180–200 l/h) having a concentration of from 50 to 100 gram of ozone per cubic meter of gas. After 80 minutes the reaction was stopped after absorption of 48 g of ozone, because a significant drop in the reaction rate became apparent at this point in time. Subsequently the polymer powder was filtered off, washed a number of times with small amounts of water and then dried at 30 mbar and 50°–100° C.

In the IR spectrum, only sulfoxide groups can be recognized.

The sulfur/oxygen ratio in the polymer obtained was 1:0.51.

We claim:

1. A process for oxidizing a polymer containing thioether groups, which comprises oxidizing the polymer in solid form in a suspension medium with ozone at a temperature from $-10°$ C. to 80° C., for forming polyarylene sulfoxides.

2. The process as claimed in claim 1, wherein the suspension medium used is water, a mineral acid, an aliphatic alcohol, an aliphatic carboxylic acid each having 1–6 carbon atoms in the alkyl radial, a carboxylic ester of these compounds, halogenated hydrocarbons having 1–12 carbon atoms or non-halogenated hydrocarbons having 1–12 carbon atoms or a mixture of the specified compounds.

3. The process as claimed in claim 1, wherein the reaction temperatures are from $-10°$ C. to $+80°$ C. and the reaction times are up to 2 hours.

4. The process as claimed in claim 1, wherein the polymer to be oxidized has recurring units of the formula

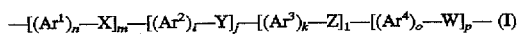

where $Ar^1$, $Ar^2$, $Ar^3$, $Ar^4$, W, X, Y and Z are, independently of one another, identical or different, the indices n, m, i, j, k, l, o and p are, independently of one another, zero or the integers 1, 2, 3 or 4, their sum being at least 2, $Ar^1$, $Ar^2$, $Ar^3$ and $Ar^4$ are arylene systems having from 6 to 18 carbon atoms and W, X, Y and Z are divalent linking groups selected from among $—SO_2—$, $—S—$, $—SO—$, $—CO—$, $—O—$, $—CO_2—$, alkylene or alkylidene groups having 1–6 carbon atoms.

5. The process as claimed in claim 1, wherein the polyarylene thioethers used have recurring units of the formulae:

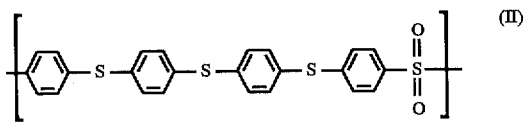

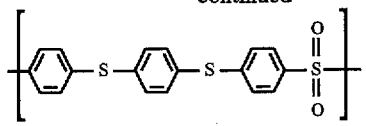 (III)

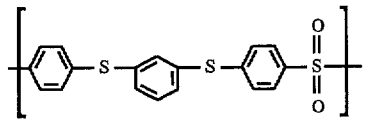 (IV)

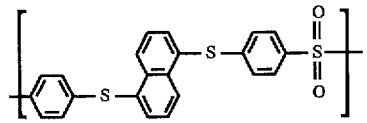 (V)

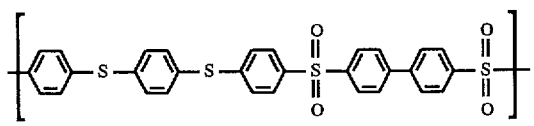 (VI)

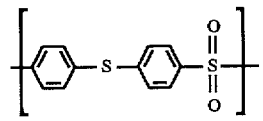 (VII)

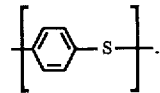 (VIII)

6. The process as claimed in claim 1, wherein the polyphenylene thioether used has an average molecular weight of from 4000 to 200,000 determined by GPC, and an average particle size of from $5 \times 10^{-6}$ to $500 \times 10^{-6}$ m.

7. A molded or functional part produced from an oxidized thioether-group-containing polymer obtained by the process as claimed in claim 1.

8. The process as claimed in claim 5, wherein the polyarylene thioethers used have recurring units of formula VIII are 1,4-linked polyarylene sulfides which have a proportion up to 30 tool of a 1,2-linkage or a 1,3-linkage or a 1,2-linkage and 1,3-linkage at the aromatic ring.

9. The process as claimed in claim 6, wherein the polyphenylene thioether used has an average molecular weight of from 10,000 to 150,000 determined by GPC and an average particle size of from $10 \times 10^{-6}$ to $300 \times 10^{-6}$ m.

10. The process as claimed in claim 9, wherein the polyphenylene thioether used has an average molecular weight of from 25,000 to 100,000 determined by GPC and an average particle size of from $10 \times 10^{-6}$ to $200 \times 10^{-6}$ m.

11. The process as claimed in claim 10, wherein the reaction temperature is from 0° to 50° C. and the reaction times are from 5 to 90 minutes.

12. The process as claimed in claim 11, wherein the reaction time is from 5 to 60 minutes.

13. The process according to claim 1, wherein the oxidation is carried out using an ozone-containing gas stream in which the ozone is present in a concentration of from 0.1 to 9% by volume.

14. The process as claimed in claim 12, wherein the oxidation is carried out using an ozone-containing gas stream in which the ozone is present in a concentration from 2 to 6% by volume.

15. The process as claimed in claim 2, wherein the lower aliphatic alcohols and carboxylic acids each have 1 to 3 carbon atoms in the alkyl group.

16. The process as claimed in claim 4, wherein said alkylene or alkylidene groups have from 1 to 4 carbon atoms.

* * * * *